US011052528B2

United States Patent
Hita

(10) Patent No.: US 11,052,528 B2
(45) Date of Patent: Jul. 6, 2021

(54) POWER TOOL

(71) Applicant: NITTO KOHKI CO., LTD., Tokyo (JP)

(72) Inventor: Hirokazu Hita, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 411 days.

(21) Appl. No.: 15/878,868

(22) Filed: Jan. 24, 2018

(65) Prior Publication Data

US 2018/0147712 A1    May 31, 2018

Related U.S. Application Data

(63) Continuation of application No. PCT/JP2016/075400, filed on Aug. 31, 2016.

(30) Foreign Application Priority Data

Aug. 31, 2015    (JP) .............................. JP2015-170026

(51) Int. Cl.
*B25F 5/00*    (2006.01)
*F16H 1/46*    (2006.01)
(Continued)

(52) U.S. Cl.
CPC .............. *B25F 5/001* (2013.01); *B25B 21/00* (2013.01); *B25B 23/141* (2013.01); *B25F 5/008* (2013.01); *F16H 1/46* (2013.01)

(58) Field of Classification Search
None
See application file for complete search history.

(56) References Cited

U.S. PATENT DOCUMENTS 2,791,304 A * 5/1957 Better ................... F16D 43/206
                                                        192/56.5
5,765,652 A * 6/1998 Mathis .................... B25F 5/001
                                                        173/216
(Continued)

FOREIGN PATENT DOCUMENTS

JP         62-173180         7/1987
JP           6-18748         3/1994
(Continued)

OTHER PUBLICATIONS

International Search Report dated Nov. 22, 2016 in International (PCT) Application No. PCT/JP2016/075400.

*Primary Examiner* — Hemant Desai
*Assistant Examiner* — Tanzim Imam
(74) *Attorney, Agent, or Firm* — Wenderoth, Lind & Ponack, L.L.P.

(57) ABSTRACT

A power tool including a drive, and a planetary gear speed reducer reducing the speed of rotation transmitted from the drive. The planetary gear speed reducer has a positioning ball between a first sun gear and a second sun gear. The first sun gear has an annular engagement portion smaller in diameter than the positioning ball, and the second sun gear has a ball-retaining recess accommodating at least half of the positioning ball and retaining the positioning ball at a position on a rotation axis of the second sun gear. The ball-retaining recess has a bottom surface substantially perpendicular to the rotation axis and a cylindrical inner surface to retain the positioning ball at a point on the rotation axis. A gap is formed between the first sun gear and the second sun gear when the positioning ball is sandwiched between the annular engagement portion and the bottom surface.

3 Claims, 2 Drawing Sheets

(51) Int. Cl.
*B25B 23/14* (2006.01)
*B25B 21/00* (2006.01)

(56) References Cited

U.S. PATENT DOCUMENTS

| | | |
|---|---|---|
| 2003/0109354 A1 | 6/2003 | Imanishi et al. |
| 2009/0255386 A1* | 10/2009 | Liao .................... B25B 23/141 81/474 |
| 2013/0032370 A1* | 2/2013 | Hirabayashi ......... B25D 11/106 173/47 |
| 2013/0199815 A1* | 8/2013 | Ullrich ................... B25F 5/008 173/213 |
| 2015/0003900 A1* | 1/2015 | Ullrich ...................... F16D 1/06 403/288 |
| 2015/0122089 A1* | 5/2015 | Rajotte .............. B25B 23/0064 81/429 |

FOREIGN PATENT DOCUMENTS

| | | | | |
|---|---|---|---|---|
| JP | H0618748 U | * | 3/1994 | ............... F16H 1/46 |
| JP | 2005-153033 | | 6/2005 | |
| JP | 2006-234177 | | 9/2006 | |
| JP | 2006234177 A | * | 9/2006 | |
| JP | 4183937 | | 11/2008 | |

* cited by examiner

POWER TOOL

TECHNICAL FIELD

The present invention relates to power tools having a drive unit, e.g. an electric motor or an air motor. More particularly, the present invention relates to a power tool wherein the rotation of a rotational drive shaft of a drive unit is reduced in speed through a planetary gear speed reduction mechanism to rotationally drive an output unit of the power tool.

BACKGROUND ART

Power tools configured to drive a screwdriver bit or a drill bit with an electric motor, an air motor, etc. are usually equipped with a speed reducer for reducing the speed of rotation of a rotational drive shaft of a motor rotating at high speed to a rotational speed demanded by a screwdriver bit, a drill bit, etc. As such a speed reducer, a planetary gear speed reducer is often used which has such features that a high speed reduction ratio can be obtained with a small number of speed reduction stages, and that an input shaft and an output shaft can be disposed on the same axis.

A planetary gear speed reducer usually has, as basic constituent elements, a circular cylindrical internal gear, a plurality of sun gears disposed in the internal gear in alignment with each other on the same axis, a plurality of planetary gears disposed between the internal gear and the respective sun gears to revolve around the sun gears while rotating about their own axes, and an output shaft disposed coaxially with the sun gears. The number of sun gears is mainly determined by the required speed reduction ratio, and is usually two or three. The sun gears and the output shaft are disposed coaxially on the axis of rotation in close proximity to each other. The rotational speed difference between each sun gear and the output shaft is relatively large due to the fact that the obtainable speed reduction ratio is high. Particularly, the rotational speed difference between the first and second sun gears as seen from the input shaft is large. Accordingly, if the first and second sun gears are driven in a state of being in contact with each other, friction between the sun gears causes a great deal of wear and frictional heat generation, which may cause a failure. Therefore, it is important, in order to improve durability, to prevent direct contact between the sun gears, particularly the first and second ones.

To prevent direct contact between the sun gears, Patent Literature 1, for example, discloses a technique in which each sun gear has a conical recessed surface formed on an end surface thereof at a position on the axis of rotation, and a positioning ball is disposed between the conical recessed surfaces of each pair of mutually adjacent ones of the sun gears and the output shaft, thereby forming a predetermined clearance between each pair of mutually adjacent ones of the sun gears and the output shaft. The positioning ball prevents direct contact between the sun gears and the output shaft and, at the same time, has an alignment function to retain the sun gears and the output shaft on the same rotation axis, thereby preventing misalignment between the rotation axes of the sun gears and the output shaft.

CITATION LIST

Patent Literature

Patent Literature 1: Japanese Patent Application Publication No. Sho 62-173180

SUMMARY OF INVENTION

Technical Problem

With the above-described conventional technique, a positioning ball disposed between two sun gears, for example, rotates together with one of the two sun gears, or rotates at a speed intermediate between those of the two sun gears. In either case, a rotational speed difference occurs between the positioning ball, which is sandwiched between the conical recessed surfaces, and at least one of the two sun gears. The positioning ball contacts each conical recessed surface at a point somewhat away from the rotation axis in the radial direction; therefore, the positioning ball rotates relative to the conical recessed surface while rubbing thereagainst at high speed, being subjected to a relatively large frictional force. Consequently, the conical recessed surfaces and the positioning ball are gradually worn away, and as the wear progresses, it may become unable to maintain the required clearance between the sun gears. As a result, the sun gears may directly contact each other, or the positioning ball may be dislodged from the conical recessed surfaces. In addition, as the wear progresses, backlash between the positioning ball and the conical recessed surfaces increases, so that the alignment function is also degraded. Accordingly, in order to further improve the durability of planetary gear speed reducers using a positioning ball, it is important to reduce, as much as possible, the wear between the positioning ball and the sun gears retaining the same.

The present invention has been made in view of the above-described problem with the conventional technique, and an object of the present invention is to provide a power tool including a planetary gear speed reducer having a configuration capable of reducing the wear between sun gears and a positioning ball.

Solution to Problem

The present invention provides a power tool comprising the following elements: a drive unit having a rotational drive shaft; a speed reduction unit having a planetary gear speed reducer for reducing the speed of rotation of the rotational drive shaft; and an output unit having a rotation output member outputting the rotation reduced in speed by the speed reduction unit. The planetary gear speed reducer comprises the following elements: a stationary internal gear; a first sun gear disposed in the stationary internal gear coaxially therewith, the first sun gear being rotationally driven by rotational driving force from the rotational drive shaft; a first planetary gear meshed with both the stationary internal gear and the first sun gear; a first rotation output member disposed coaxially with and adjacent to the first sun gear in an axial direction to retain the first planetary gear such that the first planetary gear is rotatable about its own rotation axis, the first rotation output member being rotatable about a rotation axis aligned with a rotation axis of the first sun gear, the first rotation output member being rotationally drivingly connected to the rotation output member of the output unit; and a positioning ball disposed between the first sun gear and the first rotation output member. One member of the first sun gear and the first rotation output member has an annular engagement portion smaller in diameter than the positioning ball and centered at the rotation axis of the one member. The one member further has a ball-receiving portion partially receiving the positioning ball so that the annular engagement portion engages the positioning ball over an entire circumference thereof. The other member of the first sun gear and the first rotation output member has a ball-retaining recess disposed to face the ball-receiving portion in a direction along the center axis of the stationary internal gear so that the ball-retaining recess accommodates at least a half of the positioning ball from a side opposite to the ball-receiving portion and retains a center of the positioning ball at a position on the rotation axis of the other member. The ball-retaining recess has a bottom surface receiving the positioning ball accommodated in the ball-retaining recess such that the bottom surface contacts the positioning ball at a point on the rotation axis of the other member. The ball-retaining recess further has a cylindrical inner surface extending from the bottom surface in the shape of a circular cylinder centered at the rotation axis of the other member to extend around the positioning ball received by the bottom surface. A gap is formed between the first sun gear and the first rotation output member when the positioning ball accommodated in the ball-retaining recess is sandwiched between the annular engagement portion and the bottom surface of the ball-retaining recess.

In the power tool of the present invention, the positioning ball is in point contact with the bottom surface of the ball-retaining recess on the rotation axis of the other member (and hence on the center axis of the ball-retaining recess), and on the other hand, the positioning ball engages the annular engagement portion over the entire circumference of the latter. Consequently, the positioning ball receives a large frictional force from the annular engagement portion. Therefore, when the power tool is driven, the positioning ball, basically, rotates together with the member formed with the annular engagement portion, and while doing so, the positioning ball contacts the other member mainly at one point on the rotation axis of the bottom surface of the ball-retaining recess and rotates about the one point. Accordingly, basically almost no wear occurs between the positioning ball and the annular engagement portion. The positioning ball and the bottom surface of the ball-retaining recess rub against each other only slightly; therefore, substantially no wear occurs therebetween. Accordingly, in this power tool, the amount of wear of the positioning ball and the sun gear or rotation output member that contacts the positioning ball can be reduced as compared with the conventional technique. In addition, the positioning ball disposed as stated above can align the sun gear and the rotation output member with each other, and it is therefore possible to suppress misalignment between the rotation axes thereof and to reduce vibration. Accordingly, the lifetime of the planetary gear speed reducer can be further extended. It should be noted that, when exhibiting the alignment function, the positioning ball also contacts and rubs against the cylindrical inner surface of the ball-retaining recess. However, contact pressure in the direction radial to the rotation axis is relatively small, so that there will be no significant friction. Therefore, even if the cylindrical inner surface becomes worn, there will be no influence on the clearance between the sun gears in the direction of the rotation axis.

Preferably, the arrangement may be as follows. The power tool further comprises a fan connecting the rotational drive shaft of the drive unit and the first sun gear of the planetary gear speed reducer in alignment with each other in the axial direction. The fan is attached to the rotational drive shaft displaceably in the direction of the rotation axis of the rotational drive shaft to deliver air surrounding the drive unit into the atmosphere when the fan is rotated by the rotational drive shaft. The first sun gear is displaceable in the direction of the rotation axis of the rotational drive shaft. When the rotational drive shaft is rotationally driven, the fan is pressed away from the drive unit by the flow of the air, causing the first sun gear to be pressed against the positioning ball.

With the above-described arrangement, when the power tool is driven, the positioning ball is maintained in a state of tightly sandwiched between the first sun gear and the first rotation output member. Thus, backlash between each sun gear and the positioning ball is eliminated, thereby making it possible to further enhance the effect of alignment between the first sun gear and the first rotation output member and to further reduce vibration. When the power tool is not driven, the first sun gear receives no force from the fan, and hence the positioning ball can change its orientation relatively freely within the ball-retaining recess. Consequently, as the orientation of the positioning ball changes, the points at which the positioning ball contacts the first sun gear and the first rotation output member change, and thus the positioning ball is prevented from wearing concentratedly at given points. Accordingly, it is possible to further improve the durability of the planetary gear speed reducer.

Preferably, the arrangement may be as follows. The drive unit has an electric motor, and the fan is formed of an electrically insulating material, so that the electric motor and the planetary gear speed reducer are electrically insulated by the fan.

With the above-described arrangement, it is possible to prevent an electric current applied to the electric motor from leaking to the output unit or the like through the planetary gear speed reducer.

Further, the arrangement may be as follows. The first rotation output member is a second sun gear. The second sun gear has a shaft part extending toward the first sun gear along the rotation axis of the second sun gear and having an end surface facing the first sun gear. The shaft part has a disk part attached therearound so that the disk part is rotated together with the shaft part as one unit. The first planetary gear is retained by the disk part such that the first planetary gear is rotatable about its own rotation axis. The planetary gear speed reducer further comprises a second planetary gear meshed with both the stationary internal gear and the second sun gear, and a second rotation output member disposed coaxially with and adjacent to the second sun gear in the axial direction to retain the second planetary gear such that the second planetary gear is rotatable about its own rotation axis. The second rotation output member has a rotation axis aligned with the center axis of the stationary internal gear and is drivingly connected to the rotation output member of the output unit. The ball-retaining recess is provided in the shaft part of the second sun gear. The second sun gear has a through-hole extending therethrough along the rotation axis of the second sun gear, and a connecting pin partially inserted into the through-hole from a side closer to the output unit. The second rotation output member has a pin insertion recess extending along the rotation axis of the second rotation output member. The connecting pin is inserted into the pin insertion recess, thereby allowing the second sun gear to be rotatably retained to the second rotation output member. The cylindrical inner surface of the ball-retaining recess is formed by a part of an inner peripheral wall surface of the through-hole. The bottom surface is formed by an end surface of the connecting pin.

One embodiment of the power tool according to the present invention will be explained below on the basis of the accompanying drawings.

DESCRIPTION OF EMBODIMENTS

Figure 1:
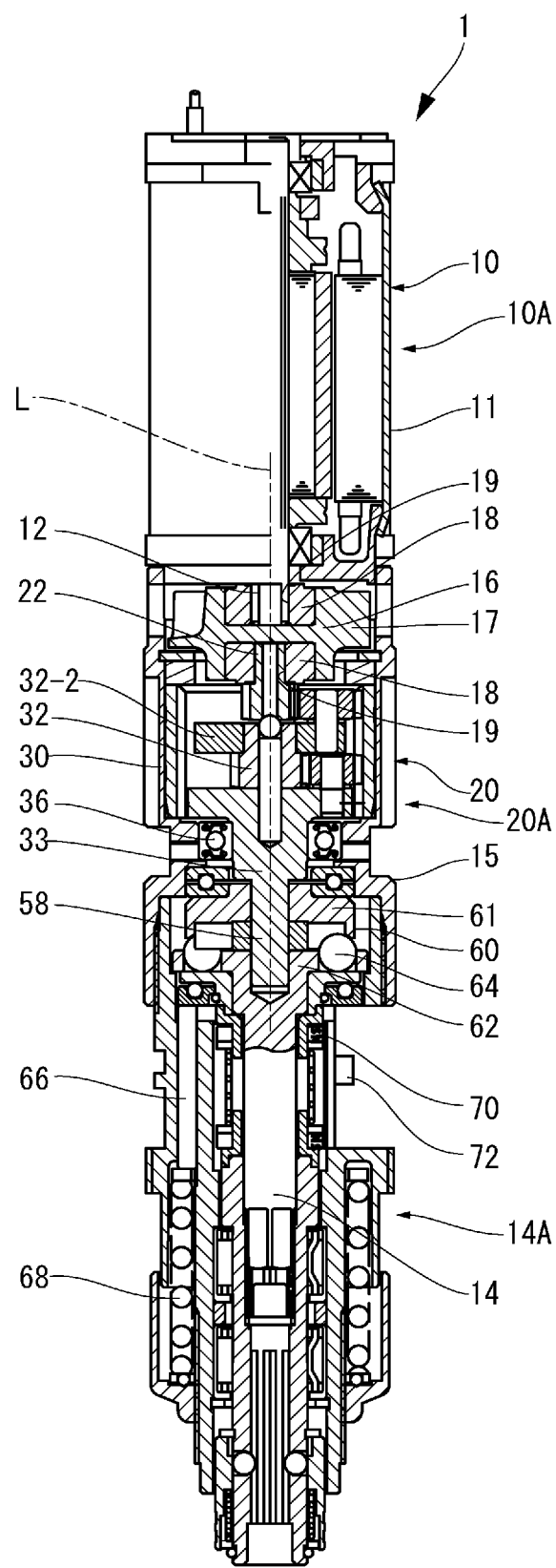
FIG. 1 is a partially-sectioned side view of an electric motor-driven screwdriver according to one embodiment of the power tool of the present invention.

An electric motor-driven screwdriver 1 according to one embodiment of the power tool of the present invention comprises, in order from the top as seen in FIG. 1, a drive unit 10A having an electric motor 10, a speed reduction unit 20A having a planetary gear speed reducer 20, and an output unit 14A having a bit holder (rotation output member) 14 drivingly connected to the electric motor 10 through the planetary gear speed reducer 20. The bit holder 14 is configured to allow a screwdriver bit (not shown) to be detachably fitted to the distal end (lower end) thereof. The screwdriver bit is engageable with a screw to be tightened with the electric motor-driven screwdriver 1. The rotation of a rotational drive shaft 12 of the electric motor 10 is transmitted to the bit holder 14 and the screwdriver bit after being reduced in speed to a desired rotational speed through the planetary gear speed reducer 20.

The planetary gear speed reducer 20 has an input shaft 22 connected to the rotational drive shaft 12 of the electric motor 10 through a fan 16. The fan 16 comprises a fan body 17 made of a resin material and two shaft-retaining portions 18 made of a metal material for receiving the rotational drive shaft 12 and the input shaft 22 in coaxial relation to each other. The rotational drive shaft 12 of the electric motor 10 and the input shaft 22 of the planetary gear speed reducer 20 have non-circular cross sections, respectively, and are inserted into respective insertion holes 19 of the shaft-retaining portions 18 that have cross-sectional configurations corresponding to those of the rotational drive shaft 12 and the input shaft 22, thereby allowing the input shaft 22 to be drivingly connected to the rotational drive shaft 12 in the rotational direction. The fan 16 is configured to electrically insulate the electric motor 10 and the planetary gear speed reducer 20 from each other and to cool the electric motor 10 by delivering the air surrounding the electric motor 10 into the atmosphere by being rotated by the electric motor 10.

Figure 2:
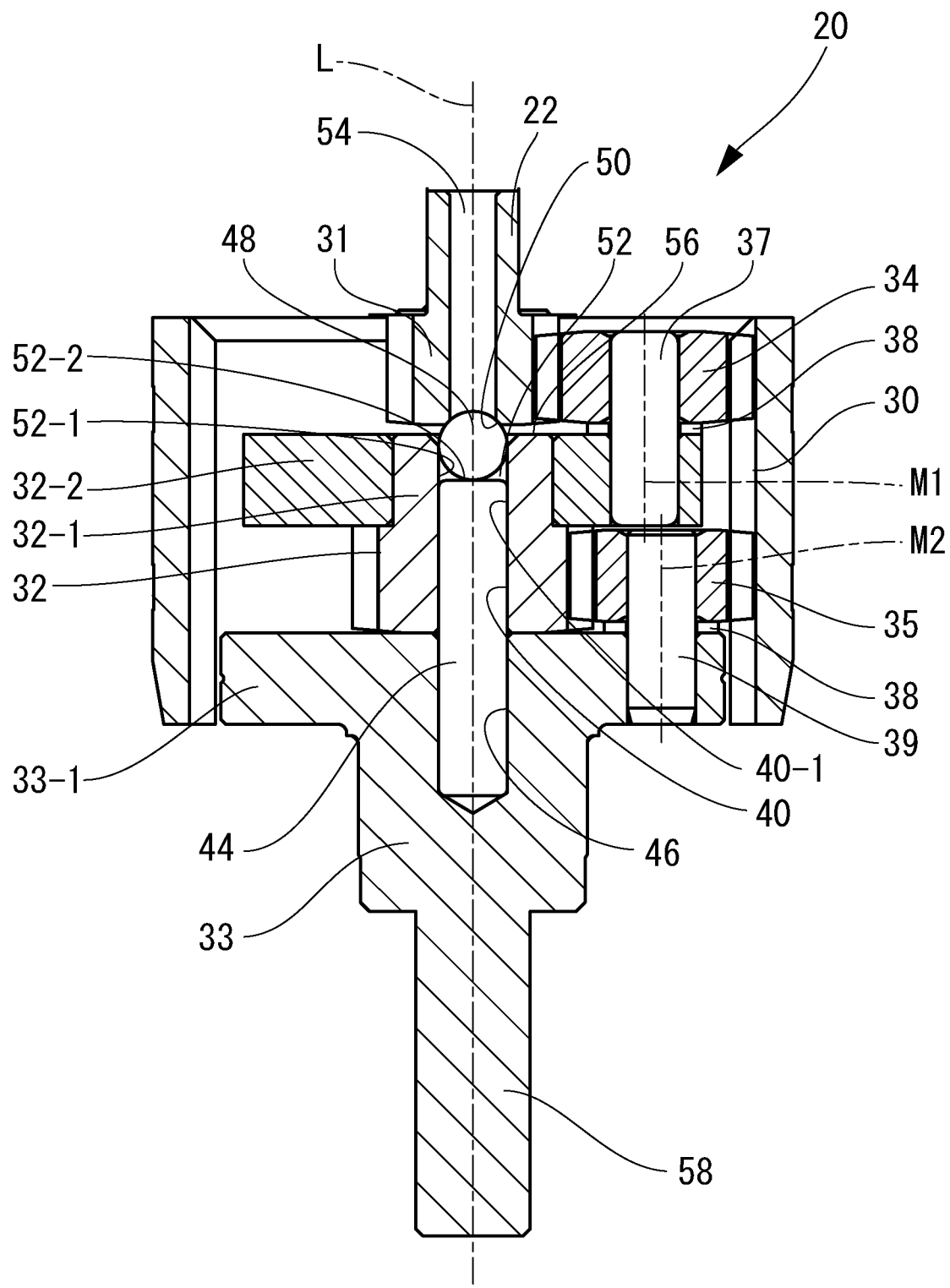
FIG. 2 is an enlarged sectional view of a planetary gear speed reducer of the electric motor-driven screwdriver shown in FIG. 1.

The planetary gear speed reducer 20 comprises, as shown in FIGS. 1 and 2, the following elements: a circular cylindrical stationary internal gear 30 secured to the inner peripheral surface of a cylindrical housing 15 connected to a housing 11 of the drive unit 10A; first and second sun gears 31 and 32 coaxially disposed in the stationary internal gear 30; an output shaft 33; and first and second planetary gears 34 and 35. The input shaft 22 is integrally formed with the first sun gear 31. The rotational drive shaft 12, the input shaft 22, the first and second sun gears 31 and 32, and the output shaft 33 are disposed in axial alignment with each other along a center axis L of the stationary internal gear 30 as a coaxial line. That is, the rotation axes of the rotational drive shaft 12, the input shaft 22, the first and second sun gears 31 and 32, and the output shaft 33 are disposed in alignment with each other on the center axis L of the stationary internal gear. The first planetary gear 34 is interposed to mesh with both the stationary internal gear 30 and the first sun gear 31. Although not shown in the figures, there are provided a plurality of first planetary gears 34 around the center axis L of the stationary internal gear 30, being circumferentially spaced from each other at a predetermined interval, in the same way as a conventional planetary gear unit. The second sun gear 32 has a shaft part 32-1 extending to a position adjacent to the first sun gear 31. The shaft part 32-1 has a disk part 32-2 secured thereto. The disk part 32-2 supports the first planetary gear 34 through a pin 37 such that the first planetary gear 34 is rotatable about its own rotation axis M1. Consequently, the first planetary gear 34 is rotatable about its own rotation axis M1 in response to the rotation of the first sun gear 31, and while doing so, the first planetary gear 34 can revolve around the first sun gear 31. The second sun gear 32 is rotated as the first planetary gear 34 revolves around the first sun gear 31. The second planetary gear 35 is interposed to mesh with both the stationary internal gear 30 and the second sun gear 32. There are provided a plurality of second planetary gears 35 around the center axis L of the internal gear 30, being circumferentially spaced from each other at a predetermined interval, in the same way as the first planetary gear 34. The output shaft 33 is rotatably mounted to the housing 15 through a bearing 36. The output shaft 33 has a large-diameter portion 33-1 disposed adjacent to the second sun gear 32. The large-diameter portion 33-1 supports the second planetary gear 35 through a pin 39 such that the second planetary gear 35 is rotatable about its own rotation axis M2. Consequently, the second planetary gear 35 is rotatable about its own rotation axis M2 in response to the rotation of the second sun gear 32, and while doing so, the second planetary gear 35 can revolve around the second sun gear 32. The output shaft 33 is rotated as the second planetary gear 35 revolves around the second sun gear 32. Between the first planetary gear 34 and the disk part 32-2 and between the second planetary gear 35 and the output shaft 33 are disposed annular sliding rings 38, respectively, which are formed of brass.

The second sun gear 32 has a through-hole 40 provided along the rotation axis thereof, and a connecting pin 44 is partially fitted into and connected to the through-hole 40. The connecting pin 44 is inserted into and rotatably retained by a pin insertion recess 46 provided along the rotation axis of the output shaft 33.

The planetary gear speed reducer 20 further has a positioning ball 48 disposed between the first sun gear 31 and the shaft part 32-1 of the second sun gear 32. The positioning ball 48 is set between a through-hole 54 extending through the first sun gear 31 along the rotation axis thereof and the through-hole 40 in the second sun gear 32. Specifically, the through-hole 54 has a diameter smaller than that of the positioning ball 48 to define a ball-receiving portion that partially receives the positioning ball 48, and the edge of an end opening of the through-hole 54 that opens in an end surface of the first sun gear 31 facing the second sun gear 32 defines an annular engagement portion 50. Thus, the positioning ball 48 partially received in the through-hole 54 is engaged with the annular engagement portion 50 over the entire circumference of the latter. On the other hand, the through-hole 40 in the second sun gear 32 has a diameter slightly larger than that of the positioning ball 48 so as to be capable of accommodating the positioning ball 48, and an end surface of the connecting pin 44 that extends substantially perpendicular to the axis of the through-hole 40 contacts the positioning ball 48 when a portion of the positioning ball 48 that is slightly greater than a half thereof is accommodated in the through-hole 40. Thus, the second sun gear 32 has a ball-retaining recess 52 having a cylindrical inner surface 52-1 defined by an inner peripheral wall surface 40-1 of the through-hole 40 and a bottom surface 52-2 defined by the end surface of the connecting pin 44.

When the positioning ball 48 is engaged with the annular engagement portion 50 and the bottom surface 52-2, a gap is formed between the end surface of the first sun gear 31 and the end surface of the shaft part 32-1 of the second sun gear 32. The positioning ball 48 engages the bottom surface 52-2 at a point on the center axis of the second sun gear 32, which aligns with the rotation axis of the second sun gear 32. With the above-described structure, the positioning ball 48 is accommodated in the ball-retaining recess 52 and engaged with the annular engagement portion 50 over the entire circumference of the latter. Thus, the positioning ball 48 performs an alignment function to suppress misalignment of the rotation axes of the first and second sun gears 31 and 32.

The rotational drive shaft 12 of the electric motor 10 and the input shaft 22 of the planetary gear speed reducer 20 are connected by the fan 16, as has been stated above. The fan 16, when driven, delivers the air surrounding the electric motor 10 into the atmosphere so as to cool the electric motor 10. At this time, the fan 16 is subjected to a force urging the fan 16 forward (downward as seen in the figures) by the flow of air delivered therefrom. The fan 16 is slightly displaceable along the rotational drive shaft 12 of the electric motor 10 and the input shaft 22 of the planetary gear speed reducer 20. Therefore, the fan 16 slightly moves forward when rotationally driven. Consequently, the first sun gear 31 is pressed forward against the positioning ball 48, thereby allowing the positioning ball 48 to be maintained in a state of being clamped between the annular engagement portion 50 of the first sun gear 31 and the bottom surface 52-2 of the ball-retaining recess 52 in the second sun gear 32.

At this time, the positioning ball 48 contacts the annular engagement portion 50 over the entire circumference of the latter with respect to the first sun gear 31. With respect to the second sun gear 32, the positioning ball 48 comes in point contact with the bottom surface 52-2 at a point on the rotation axis of the second sun gear 32. Therefore, when the electric motor 10 is driven, the positioning ball 48 rotates together with the first sun gear 31 in a state of being in point contact with the bottom surface 52-2. Accordingly, no wear occurs between the positioning ball 48 and the first sun gear 31, and wear between the positioning ball 48 and the second sun gear 32 is very small.

In actuality, however, because the first sun gear 31 is connected to the rotational drive shaft 12 of the electric motor 10 through the fan 16, which is made of a resin material, there may be some backlash in the first sun gear 31, and the positioning ball 48 may be subjected to a force that causes the positioning ball 48 to be laterally displaced from the center axis L of the stationary internal gear 30. In such a case, however, the positioning ball 48 contacts the cylindrical inner surface of the ball-retaining recess 52 to achieve alignment of the first and second sun gears 31 and 32. The force that causes the positioning ball 48 to contact the cylindrical inner surface 52-1 at this time is due to the backlash in the first sun gear 31 and is not large; therefore, the wear due to the contact does not progress very rapidly. Further, the wear in the axial direction, in particular, is small in this case; therefore, the clearance between the first sun gear 31 and the second sun gear 32 will not decrease. Accordingly, the wear in the axial direction will not cause a serious problem.

As shown in FIG. 1, the output shaft 33 is connected to the bit holder 14 through a clutch mechanism 60. The clutch mechanism 60 has a first clutch member 61 secured to the output shaft 33 of the planetary gear speed reducer 20, a second clutch member 62 connected to the bit holder 14, and clutch balls 64 connecting the first and second clutch members 61 and 62 in the rotational direction. The second clutch member 62 is pressed toward the first clutch member 61 by a spring 68 through a plurality of pins 66 (only one pin 66 shown in the figure). During a screw tightening operation performed with a screwdriver bit fitted to the bit holder 14, for example, when a screw has been completely tightened, the screw cannot be rotated any more. Consequently, the second clutch member 62 is stopped from rotating, and the first clutch member 61, to which driving force is being transmitted, applies a force to the second clutch member 62 through the clutch balls 64 to press the second clutch member 62 forward. When the pressing force exceeds a predetermined urging force of the spring 68, the second clutch member 62 is moved forward while compressing the spring 68, thereby releasing the driving connection in the rotational direction between the first clutch member 61 and the second clutch member 62. In this way, the clutch function is activated.

The second clutch member 62 has a magnet 70 attached thereto. When the second clutch member 62 moves forward as a result of the activation of the clutch mechanism 60, the magnet 70 also moves forward together with the second clutch member 62. A magnetism-detecting sensor 72 is provided at a side (right-hand side as seen in the figure) of the magnet 70 to detect the movement of the magnet 70. When the sensor 72 detects the movement of the magnet 70 and hence the activation of the clutch mechanism 60, the drive of the electric motor 10 is forcedly stopped, thereby preventing an excessive torque from being applied to the screw continuously.

The first sun gear 31 is slightly displaceable in the axial direction, as has been stated above, and the second sun gear 32 and the first and second planetary gears 34 and 35 are also displaceable in the axial direction. The disk part 32-2 of the second sun gear 32 is fixed in the rotational direction relative to the shaft part 32-1 thereof but displaceable in the axial direction. Thus, each gear is slightly displaceable in the axial direction. Consequently, vibration or shock occurring during the activation of the clutch mechanism 60 is absorbed by displacement of each gear in the direction of the rotation axis thereof, thereby preventing a great shock from being concentratedly applied to one point, which might otherwise cause breakage of the gear.

In the electric motor-driven screwdriver 1 according to the embodiment shown in the figures, the first sun gear 31 and the second sun gear 32 are kept out of direct contact with each other, but the second sun gear 32 and the output shaft 33 are placed in direct contact with each other. The reason for this is as follows. The difference in rotational speed between the second sun gear 32 and the output shaft 33 is very small as compared with the rotational speed difference between the first sun gear 31 and the second sun gear 32. Therefore, even if the second sun gear 32 and the output shaft 33 rotate relative to each other while being in direct contact with each other, there will be no serious wear and frictional heat generation, and substantially no problem will arise. It should, however, be noted that the second sun gear 32 and the output shaft 33 may also be kept out of direct contact with each other by adopting the above-described structure using the positioning ball 48 or providing therebetween a sliding member such as the sliding ring 38.

In the foregoing description, the power tool of the present invention has been explained by way of an embodiment in which the power tool is applied to an electric motor-driven screwdriver. However, the power tool of the present invention may also use an air motor as a drive source and is applicable to other tools such as a drill and a polishing machine. Further, although the above-described planetary gear speed reducer 20 is a two-stage speed reducer having two sun gears, the planetary gear speed reducer 20 may be a single-stage speed reducer having only one sun gear, or alternatively, may be a three or more stage speed reducer having three or more sun gears. Further, although, in the foregoing embodiment, the ball-retaining recess 52 comprises the inner peripheral wall surface 40-1 of the through-hole 40 and the end surface of the connecting pin 44 inserted into the through-hole 40, the ball-retaining recess 52 may comprise a blind hole, i.e. a hole with a bottom surface, formed in a rear end surface 56 of the second sun gear 32, not using the end surface of the connecting pin 44. In the case of a single-stage speed reducer having a single sun gear, in particular, the connecting pin 44 need not be provided; therefore, it is preferable that the ball-retaining recess 52 be formed directly in the output shaft, which is a first rotation output member. Further, the formation positions of the annular engagement portion 50 and the ball-retaining recess 52, which contact the positioning ball 48, may be reversed. That is, the arrangement may be such that the annular engagement portion 50 is provided on the second sun gear 32, and the ball-retaining recess 52 is provided in the first sun gear 31. Further, the bottom surface of the ball-retaining recess 52 need not be a plane surface perpendicular to the axis thereof but may be configured in any shape that allows the positioning ball to contact the bottom surface at a point on the center axis of the ball-retaining recess 52, for example, a hemispherical surface curved rearwardly.

LIST OF REFERENCE SIGNS

Electric motor-driven screwdriver 1; electric motor 10; drive unit 10A; rotational drive shaft 12; bit holder 14; output unit 14A; housing 15; fan 16; fan body 17; shaft-retaining portions 18; insertion holes 19; planetary gear speed reducer 20; speed reduction unit 20A; input shaft 22; stationary internal gear 30; first sun gear 31; second sun gear 32; disk part 32-2; output shaft 33; first planetary gear 34; second planetary gear 35; bearing 36; sliding rings 38; through-hole 40; inner peripheral wall surface 40-1; connecting pin 44; pin insertion recess 46; positioning ball 48; annular engagement portion 50; ball-retaining recess 52; cylindrical inner surface 52-1; bottom surface 52-2; through-hole 54; rear end surface 56; clutch mechanism 60; first clutch member 61; second clutch member 62; clutch balls 64; pins 66; spring 68; magnet 70; sensor 72; center axis (coaxial line) L of stationary internal gear; rotation axis M1 of (first planetary gear); rotation axis M2 (of second planetary gear).

The invention claimed is:

1. A power tool comprising:
a drive unit having a rotational drive shaft;
a speed reduction unit having a planetary gear speed reducer for reducing speed of rotation of the rotational drive shaft; and
an output unit having a rotation output member outputting the rotation reduced in speed by the speed reduction unit;
the planetary gear speed reducer comprising:
a stationary internal gear;
a first sun gear disposed in the stationary internal gear coaxially therewith, the first sun gear being rotationally driven by rotational driving force from the rotational drive shaft;
a first planetary gear meshed with both the stationary internal gear and the first sun gear;
a first rotation output member disposed coaxially with and adjacent to the first sun gear in an axial direction to retain the first planetary gear such that the first planetary gear is rotatable about its own rotation axis, the first rotation output member being rotatable about a rotation axis aligned with a rotation axis of the first sun gear, the first rotation output member being rotationally drivingly connected to the rotation output member of the output unit; and
a positioning ball disposed between the first sun gear and the first rotation output member,
wherein one member of the first sun gear and the first rotation output member has an annular engagement portion smaller in diameter than the positioning ball and is centered at the rotation axis of the one member, the one member further having a ball-receiving portion partially receiving the positioning ball so that the annular engagement portion engages the positioning ball over an entire circumference thereof,
wherein an other member of the first sun gear and the first rotation output member has a ball-retaining recess disposed to face the ball-receiving portion in a direction along a center axis of the stationary internal gear so that the ball-retaining recess accommodates at least a half of the positioning ball from a side opposite to the ball-receiving portion and retains a center of the positioning ball at a position on the rotation axis of the other member, the ball-retaining recess having a bottom surface receiving the positioning ball accommodated in the ball-retaining recess such that the bottom surface contacts the positioning ball at a point on the rotation axis of the other member, the ball-retaining recess further having a cylindrical inner surface extending from the bottom surface in a shape of a circular cylinder centered at the rotation axis of the other member to extend around the positioning ball received by the bottom surface,
wherein a gap is formed between the first sun gear and the first rotation output member when the positioning ball accommodated in the ball-retaining recess is sandwiched between the annular engagement portion and the bottom surface of the ball-retaining recess,
wherein the positioning ball is rotatably accommodated in the ball-retaining recess and contacts the cylindrical inner surface to align the first sun gear and the first rotation output member with each other,
wherein the first rotation output member is a second sun gear, the second sun gear having a shaft part extending toward the first sun gear along the rotation axis of the second sun gear and having an end surface facing the first sun gear, the shaft part having a disk part attached therearound so that the disk part is rotated together with the shaft part as one unit, the first planetary gear being retained by the disk part such that the first planetary gear is rotatable about its own rotation axis,
the planetary gear speed reducer further comprising:
a second planetary gear meshed with both the stationary internal gear and the second sun gear; and
a second rotation output member disposed coaxially with and adjacent to the second sun gear in the axial direction to retain the second planetary gear such that the second planetary gear is rotatable about its own rotation axis, the second rotation output member having a rotation axis aligned with the center axis of the stationary internal gear, the second rotation output member being drivingly connected to the rotation output member of the output unit, wherein the ball-retaining recess is provided in the shaft part of the second sun gear, wherein the second sun gear has a through-hole extending therethrough along the rotation axis of the second sun gear, and a connecting pin partially inserted into the through-hole from a side closer to the output unit, wherein the second rotation output member has a pin insertion recess extending along the rotation axis of the second rotation output member, wherein the connecting pin is inserted into the pin insertion recess, thereby allowing the second sun gear to be rotatably retained to the second rotation output member, and wherein the cylindrical inner surface of the ball-retaining recess is formed by a part of an inner peripheral wall surface of the through-hole, the bottom surface being formed by an end surface of the connecting pin.

2. The power tool of claim 1, further comprising:

a fan connecting the rotational drive shaft of the drive unit and the first sun gear of the planetary gear speed reducer in alignment with each other in the axial direction, the fan being attached to the rotational drive shaft displaceably in a direction of a rotation axis of the rotational drive shaft to deliver air surrounding the drive unit into an atmosphere when the fan is rotated by the rotational drive shaft, wherein the first sun gear is displaceable in the direction of the rotation axis of the rotational drive shaft, and wherein when the rotational drive shaft is rotationally driven, the fan is pressed away from the drive unit by a flow of the air, causing the first sun gear to be pressed against the positioning ball.

3. The power tool of claim 2, wherein the drive unit has an electric motor, the fan being formed of an electrically insulating material, so that the electric motor and the planetary gear speed reducer are electrically insulated by the fan.

* * * * *